Aug. 20, 1929.  C. STEDEFELD  1,725,310
LATERAL SPRINGING FOR VEHICLE RUNNING GEARS
Filed Sept. 19, 1927  2 Sheets-Sheet 1
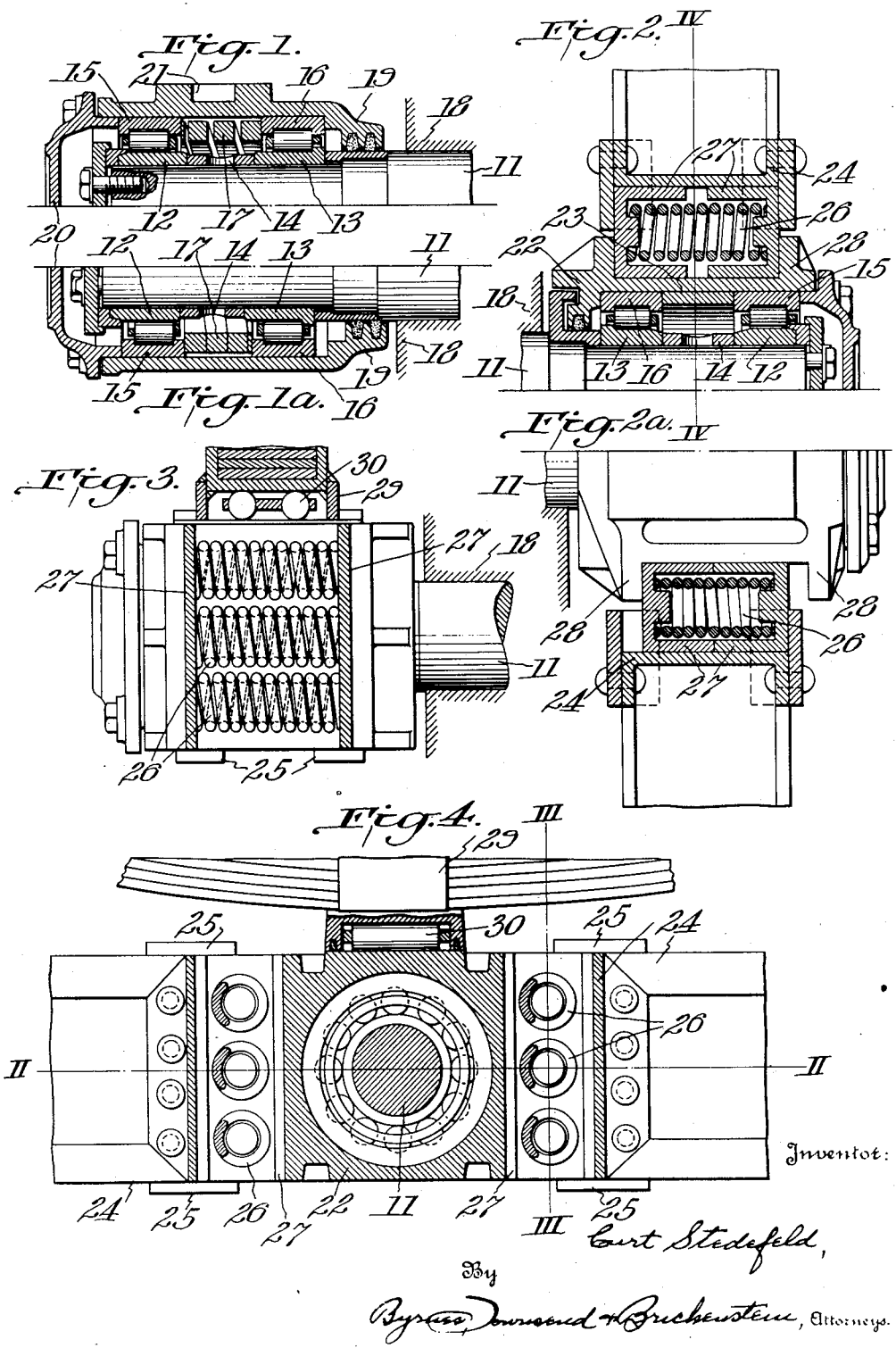

Aug. 20, 1929.  C. STEDEFELD  1,725,310
LATERAL SPRINGING FOR VEHICLE RUNNING GEARS
Filed Sept. 19, 1927  2 Sheets-Sheet 2
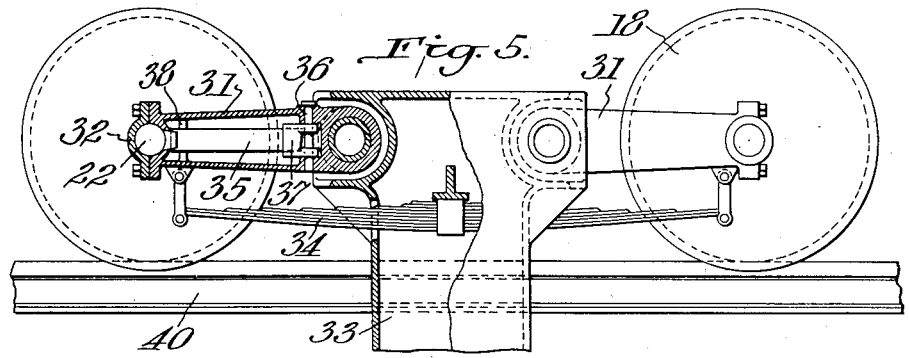
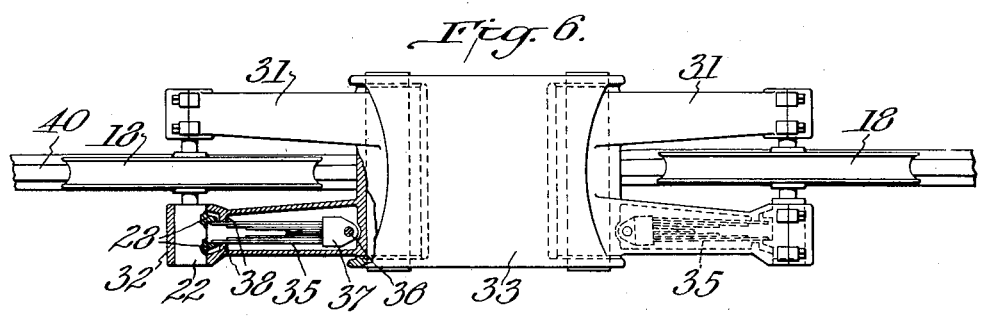
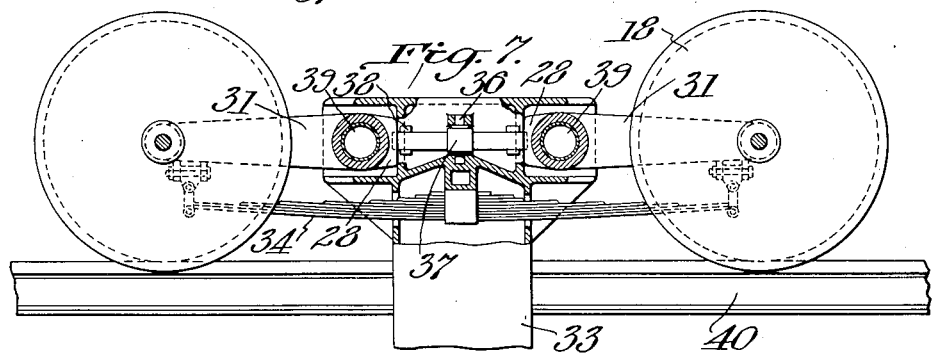
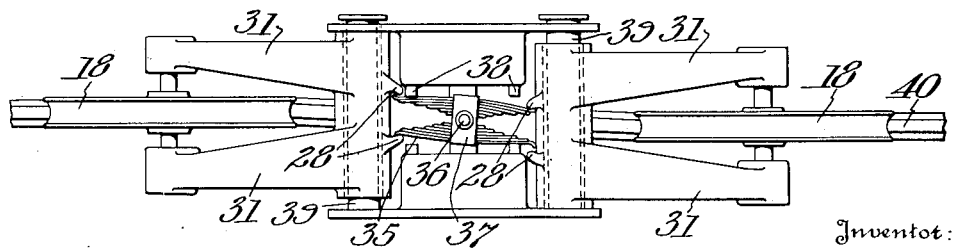

Patented Aug. 20, 1929.

1,725,310

UNITED STATES PATENT OFFICE.

CURT STEDEFELD, OF HEIDELBERG, GERMANY.

LATERAL SPRINGING FOR VEHICLE RUNNING GEARS.

Application filed September 19, 1927, Serial No. 220,534, and in Germany March 17, 1926.

With increase in vehicle weights and speeds in addition to vertical springing of the vehicle body in relation to the running gear, provision must also be made for spring transmission of lateral shocks from the running gear to the vehicle body. In particular the pivoted trucks of ordinary railway trains have been provided with lateral springing means for the truck frames in relation to the vehicle bodies, either by pendulum suspension or through springs. Pendulum suspensions are also known in street tramways.

The present invention for the first time uses one and the same spring system stressed in one manner for both directions of lateral movement devices and preloaded in both directions in such a manner that only side shocks of greater than a predetermined value cause sprung lateral movement. The advantage lies in the compact, light, cheap and reliable construction of the spring members and in the insulation of the passengers or goods from inconveniently large shocks, while the preloading of the springs makes impossible the setting up of inconvenient rolling vibration through small lateral shocks.

Typical embodiments of the invention are illustrated in the accompanying drawings, in which Figure 1 is a fragmentary longitudinal section through an axle box of the type employed on street cars, the parts being shown in normal position.

Figure 1ª is a view similar to Fig. 1 but showing relative displacement of the parts.

Figure 2 is a fragmentary sectional plan view taken on line II—II of Fig. 4 illustrating a different spring arrangement for car axles, and showing the parts in normal position.

Figure 2ª is a view similar to Fig. 2, but with some of the sectional detail omitted, showing relative displacement of the parts.

Fig. 3 is a vertical section on line III—III of Fig. 4,

Fig. 4 is a horizontal section on line IV—IV of Fig. 2,

Figs. 5 and 6 are a side elevation and a plan view, respectively, of a running gear for a monorail suspension railway, parts of each view being shown in section, and Figs. 7 and 8 are a side elevation, with parts shown in section, and a plan view, respectively, of another form of monorail running gear.

A particularly simple and compact embodiment of the invention is shown in Figure 1 of the accompanying drawings which illustrates in longitudinal section a roller axle box for example for street tramways. On the axle end 11 the single shouldered inner race 12 and the plain race 13 of two roller bearings are tightly clamped against a distance ring 14. Whereas usually a fixed distance ring is also provided between the double shouldered outer races 15 and 16, here a preloaded cylindrical helical compression spring 17 is mounted between them. The preliminary stress or "preloading" of the spring 17 can not be decreased since the spring is held in stressed condition by the channel races 15, 16 which are fixed within the stationary housing 19. Side thrusts of lesser magnitude than the force used in initially stressing spring 17 cannot, of course, effect a further compression of the spring, which when subjected to small lateral forces acts as a rigid member and maintains the axle in its mid-position. When the lateral force exceeds the preloading force, the spring 17 will be compressed, the shoulder of the inner race 13 taking the rollers and outer race 16 to the left. The outer race 15 with its rollers remains stationary in the housing while the inner race 12 slides freely along the rollers. Naturally, sufficient play must be allowed for this motion between the slidable running system including the running wheel hub 18, and the stationary bearing housing 19 with its cover 20. The carrying spring of the vehicle body engaging at 21 can be arranged as usual since the bearing housing remains laterally at rest.

This method of construction with a helical spring coaxially carried on the running axle between laterally slidable roller bearing shoulders is not in fact limited to shouldered roller bearings, but in principle can also be used with ball and thrust bearings. Such bearings in combination with axial ball bearings however give long axle boxes and are therefore but seldom used.

An arrangement with a sliding axle box 22 but with internal nonslidable roller bearings 12, 13 and 15, 16 is shown by Figure 2 (longitudinal section and elevation) Figure 3 (side elevation) and Figure 4 (cross section). There the roller bearing outer races 15, 16, are held fixed in the housing 22 by the distance ring 23. The spring members lie outside the axle box 22 between it and the guide frame 24 belonging to the vehicle body, and consist of a series of cylindrical helical springs 26. The action of the springs is seen from the right hand side of Figure 2; there the running axle 11 with the axle box 22 is moved as far outwards as the spring guides 27 will allow. These latter prevent bending and clamping of the springs, which are excentrically supported by the frame edges 24 and the axle box edges 28. During vertical oscillation of the vehicle body on the suspension springs 29, as seen from the drawing, the axle box 22 slides up and down in the guides 27, the latter being prevented from moving as well by the upper and lower abutments 25 of the guide frame 24. Naturally these abutments could be mounted on the axle box edges 28 when the spring system 26 together with its guides 27 would move up and down with the axle box 22. The action of the spring system 26 during lateral shocks would be the same. Since the running axle 11 and axle box 22 move together in this arrangement in contradistinction to that of Figure 1, the wheel hub 18 can be close to the axle box 22 without intermediate free space. On the other hand the axle box 22 must be slidable under the suspension spring 29 of the vehicle body. For this purpose the spring clip 29 is best made easily slidable on the axle box 22 by means of rollers 30, Figures 3 and 4.

How far the invention can be applied to particular cases, is shown by Figures 5 to 8 which illustrate a two axled turning arm running gear for high speed suspended railways. The guiding of the running wheels 18 on turning arms 31 has among other advantages that of particularly low unsprung weight in the up and down play of the vehicle carrier arm 33 on the suspension spring 34. If the lateral springing of the running wheels 18 is also to be effected with the lowest possible weight, this can be carried out according to Figures 5 and 6. The axle box 22 is again, similarly to Figures 2 to 4, laterally slidable within the turning arm head. For its return and maintenance in the said position there is provided a leaf spring system 35 within the turning arm 31. It consists of two oppositely placed cantilever spring sets which are secured in a common slip 37 rotatable on a vertical pivot 36. In the preloaded mid position, Figure 6 left hand side, the spring ends on both sides bear equally on abutments 28 on the axle box 22 and on abutments 38 of the turning arm 31. In Figure 6 right hand side, the same system is shown laterally displaced (similarly to Figure 2 right hand side) and in view of what is stated above no further description is necessary.

Figures 7 and 8 show a common lateral springing for two running axles, which renders running on curves easier. Here not the axle boxes alone can slide laterally but the whole turning arm 31 can move sideways on its pivot 39. Accordingly the abutments 28 are formed on the hub of the turning arm and abutments 38 on the vehicle body 33. The action is controlled by the combination of the two bending springs 35 in a single clip 37 rotatable on a vertical pivot 36 in the centre of the running gear. If the running gear is not constructed as a rotatable truck, the carrier arm 33 therefore being rigidly connected to the vehicle body and particularly when the vehicle has four axles, that is with a rigid two axled running gear at each end, sharp curves can only be traversed where lateral movement is possible, as Figure 8 shows. If here the leading wheel slides to one side, the inclined position taken by the spring system 35 about the pin 36 aids the desired sliding of the second wheel to the other side as an inspection of the conditions of motion in Figure 8 will show.

The spring arrangement of Figures 7 and 8 is not restricted to suspended running gears, but can also be used in essence for standing running gears, for example in street tramways. With larger distances between the wheels the necessary length of the spring system 35 can be obtained for example by using instead of the single pile of laminations 37, a two armed lever with a pivot at the centre, and a laminated spring at each end.

I claim:

1. In a vehicle running gear, the combination with a wheel axle and a support for the same, of spring means for opposing relative lateral movement of said axle and support, said means comprising a pair of abutments carried by said axle, a cooperating pair of abutments carried by said support, and a spring so arranged between said pairs of abutments that relative lateral movement of said axle in either direction from its mid-position establishes stresses of the same nature in said spring, said spring being preloaded to prevent all lateral movement until the side thrust exceeds a predetermined minimum value.

2. A vehicle running gear of the type in which spring means opposes relative lateral movement of the vehicle and a wheel axle, characterized by the fact that said spring means is preloaded to prevent said relative movement until a predetermined minimum lateral thrust is exceeded and that the stress in said spring means increases in magnitude from said preloading value as lateral movement takes place under lateral thrusts in excess of said minimum.

3. In a lateral spring device for vehicle running gears, the combination with a wheel axle and an axle support, of spring means carried by said support and subjected to its minimum stress when the axle occupies its mid position with respect to said support, said spring means being preloaded to prevent all relative lateral movement of said axle and axle support until a predetermined minimum side thrust is exceeded.

4. In a vehicle running gear, the combination with the vehicle body and an axle carrying a supporting wheel, of spring means for yieldingly resisting relative lateral movement of said vehicle body and said axle, said spring means being preloaded to prevent said relative lateral movement until a predetermined minimum side thrust is exceeded.

5. In a vehicle running gear, the combination with a vehicle having a supporting axle and wheel, and springs for transferring the vehicle load to said axle, of spring means opposing relative lateral movement of said vehicle and axle, said spring means comprising a plurality of springs and means for so mounting each of said springs between said vehicle and axle to subject each of said springs to its minimum stress when the axle is in its mid-position with respect to said vehicle.

6. A lateral spring device for vehicle running gears comprising, in combination with the vehicle and its running gears, spring abutments, and springs so designed, and arranged between said abutments, that the spring yielding commences only after a predetermined minimum side force is exceeded and that the springs undergo the same nature of stress whichever the lateral direction of movement of the wheels of the vehicle may be.

7. A lateral spring device for vehicle running gears comprising, in combination with the vehicle and its running gears, laterally slidable shouldered roller bearings, and helical springs lying coaxially around each running axle of the vehicle, one or the other of said bearings being adapted to be carried along by lateral sliding of the running axle according to the direction of sliding, the arrangement being such that the spring yielding commences only after a predetermined minimum side force is exceeded and that the springs undergo the same nature of stress whichever the lateral direction of movement of the wheels of the vehicle may be.

8. A lateral spring device for vehicle running gears comprising, in combination with the vehicle and its running gears, axle boxes forming parts of these gears, lateral guides therefor in the vehicle body, and springs arranged between said axle boxes and said guides and being so designed that the spring yielding commences only after a predetermined minimum side force is exceeded and that the springs undergo the same nature of stress whichever the lateral direction of movement of the wheels of the vehicle may be.

9. A lateral spring device for vehicle running gears comprising, in combination with the vehicle and its running gears, axle boxes forming parts of these gears, guides therefor in the vehicle body, suspension springs supported and laterally slidable on the axle boxes, rollers interposed between said boxes and said springs, and spring means normally retaining said axle boxes in horizontal mid-position with respect to said guides, said spring means being so designed that the spring yielding commences only after a predetermined minimum side force is exceeded and that the springs undergo the same nature of stress whichever the lateral direction of movement of the wheels of the vehicle may be.

In testimony whereof I have affixed my signature.

CURT STEDEFELD.